United States Patent [19]

Daniel et al.

[11] Patent Number: 5,657,247

[45] Date of Patent: Aug. 12, 1997

[54] METHOD OF PLAYING BACK A SEQUENCE OF IMAGES, IN PARTICULAR AN ANIMATED SEQUENCE, AS RECEIVED SUCCESSIVELY IN DIGITIZED FORM FROM A REMOTE SOURCE, AND CORRESPONDING APPARATUS

[75] Inventors: Patrick Daniel; Piotr Szychowiak, both of Illkirch; Thierry Houdoin, Lannion, all of France

[73] Assignees: France Telecom; Alcatel Business Systems, both of Paris, France

[21] Appl. No.: 411,228

[22] Filed: Mar. 27, 1995

[30] Foreign Application Priority Data

Mar. 28, 1994 [FR] France ................................ 94 03600

[51] Int. Cl.[6] ...................................... G06T 13/00
[52] U.S. Cl. .................. 364/200.61; 395/173; 395/174
[58] Field of Search .................. 364/514 A; 395/152, 395/154; 360/35.1, 48, 73.01, 6, 73.07, 73.08; 352/84, 87, 88; 348/5, 18, 24, 578; 345/122

[56] References Cited

U.S. PATENT DOCUMENTS

| | | |
|---|---|---|
| 3,073,896 | 1/1963 | James . |
| 4,710,812 | 12/1987 | Murakami et al. . |
| 5,261,041 | 11/1993 | Susman .......................... 395/152 |
| 5,384,908 | 1/1995 | MacKinlay et al. ............. 395/152 |
| 5,491,591 | 2/1996 | Lemelson ...................... 360/35.1 |
| 5,502,807 | 3/1996 | Beachy ............................ 395/152 |

FOREIGN PATENT DOCUMENTS

| | | |
|---|---|---|
| 0309280A1 | 3/1989 | European Pat. Off. . |
| 0397206 | 11/1990 | European Pat. Off. . |
| 0562221A1 | 9/1993 | European Pat. Off. . |
| WO9320652 | 10/1993 | WIPO . |

OTHER PUBLICATIONS

*Patent Abstracts of Japan*, vol. 15, No. 486 (E-1143) 10 Dec. 1991 & JP-A-03 211 984 (Hitachi Ltd) 17 Sep. 1991.
French Search Report FR 9403600.

*Primary Examiner*—Emanuel T. Voeltz
*Assistant Examiner*—Thomas Peeso
*Attorney, Agent, or Firm*—Sughrue, Mion, Zinn, Macpeak & Seas

[57] ABSTRACT

A method and apparatus for playing back a sequence of images from a run of component images successively supplied in digital form by a remote source to a receiver apparatus having the function of playing back the images of the sequence at a given rate, and in which each image constitutes an independent set that is received in the form of data trains. The apparatus includes verification that each received data train and each run of trains making up a set is valid, storing the most recently received valid set, reconstituting image signals from the most recently received valid set, and a clock for locally and independently generating clock signals for triggering visual reproduction of images as a function of circumstances.

4 Claims, 2 Drawing Sheets

METHOD OF PLAYING BACK A SEQUENCE OF IMAGES, IN PARTICULAR AN ANIMATED SEQUENCE, AS RECEIVED SUCCESSIVELY IN DIGITIZED FORM FROM A REMOTE SOURCE, AND CORRESPONDING APPARATUS

The invention relates to a method and to apparatus, in particular of the videophone type, designed to play back an animated sequence of images at a rate that enables realistic and quasi-instantaneous playback of animations that are provided in the sequence by means of a run of component images that are provided in succession and in digitized form by the remote source.

BACKGROUND OF THE INVENTION

In the prior art, a sequence taken by a camera gives rise to a run of images being made where each image constitutes a distinct entity, and where the images are intended subsequently to be displayed in succession at a given rate that enables any animated movements that may have occurred in the scene while the sequence was being taken to be played back.

For example, when the scene is filmed by means of a television camera, signals representative of each image are obtained by scanning a photosensitive target that is included in a scanner and on which an image of the filmed scene is produced by the lens of the camera. This line-type scanning is performed at a rate and under conditions that are determined, and the resulting image signal is processed so as to enable it to be transmitted to remote apparatus that includes or constitutes an image receiver.

It is common practice to scan images at a rate of twenty-five or thirty images per second so as to enable any motion that may be taking place in the filmed scene to be picked up and subsequently played back realistically at a receiver apparatus. It is common practice to double the playback image rate in order to eliminate visual phenomena that may occur and that observers find troublesome, such as flicker. When images are played back by means of a television type apparatus, each reproduced image is commonly played back in two stages, as two successive fields, one field comprising the even scan lines on the screen of the receiver apparatus, and the other comprising the odd scan lines.

Motion playback implies that the receiver apparatus is capable of producing images from a run at a rate that corresponds to the rate at which the images were taken.

It is conventional to add synchronizing pulses to the image signal as provided by the camera, in particular to mark the beginnings of lines and the beginnings of image fields, thereby enabling the receiver apparatus to synchronize itself. When transmission is performed in such a manner as to enable substantially instantaneous display of the transmitted images, as is the case with television or with videophony, the receiver apparatus is commonly synchronized relative to a clock that governs image transmission at the source. Such synchronization can be performed, for example, by means of a digital phase-locked loop circuit when the images are transmitted synchronously and in digitized form.

Unfortunately, although that solution is usually satisfactory, it is not always applicable, particularly when the transmission between a source and a receiver apparatus is liable to take place over at least a portion of its path via means that do not guarantee proper transmission to the receiver apparatus of the synchronizing signals as generated by the clock of the source. This applies in particular when the succession of images making up a sequence coming from a source is transmitted, over at least a portion of its path, via a connection that is established via an asynchronous time-division network.

It is possible, particularly under such circumstances, for the digitized images of a sequence transmitted by a source to arrive at a rate that is only approximately the normal design rate for proper playback thereof by the receiver apparatus, even though the same images are indeed transmitted at the correct rate from the source.

It is also possible to envisage that images are transmitted by the source at a rate that is merely within some acceptable tolerance range without being exactly the rate that would normally be expected by the receiver apparatus.

OBJECT AND SUMMARY OF THE INVENTION

The present invention thus provides a method of playing back a sequence of animated images at a rate enabling realistic and almost instantaneous playback of any animations that appear in the sequence, on the basis of a run of component images supplied in succession and in digital form by a remote source to an apparatus that includes or that constitutes a receiver. The method is designed to be implemented, when each component image is respectively transmitted to the apparatus in the form of an independent set of successive data trains organized in application of rules common to the sets, which sets have a common maximum possible size and are individualized, in particular by two individual image markers, one positioned as a header and the other at the end of each set.

According to a characteristic of the invention, the playback method provides for local and self-contained generation of the playback rate and for the following operations to be performed repetitively on reception:

each set that has been transmitted validly by means of data trains is reconstituted after verifying the validity and the serial order of the data trains successively received for said set;

at least the most recently received set that has been verified as being valid is stored temporarily; and the image corresponding to the most recently received and stored valid set is played back visually for a time lapse that is equal to the image-presence time fixed by the chosen playback rate, or optionally to a multiple of that time.

The invention also provides an apparatus serving in particular to play back almost instantaneously a sequence of animated images at a realistic visual playback rate R for the sequence on the basis of a run of images supplied successively in digitized form by a remote source, with each image being transmitted in the form of an independent set of successive data trains organized in application of rules that are common to the sets, each set being individualized in particular by two markers, one being placed as a header and the other being placed at the end of each set.

According to a characteristic of the invention, the apparatus has locally available, internally or externally, means for verifying that each received data train and each run of data trains making up an individualized set is valid, i.e. complies with the rules, means for temporarily storing at least the most recently obtained valid set, means for reconstituting the signals required for visual reproduction of said most recently received valid set, and clock means in particular for generating the playback rate required for triggering visual reproduction of the image corresponding to the most recently received valid set that is then being stored temporarily.

BRIEF DESCRIPTION OF THE DRAWINGS

The invention, its characteristics, and its advantages are described in greater detail in the following description given with reference to the figures described below.

MORE DETAILED DESCRIPTION

Figure 1:
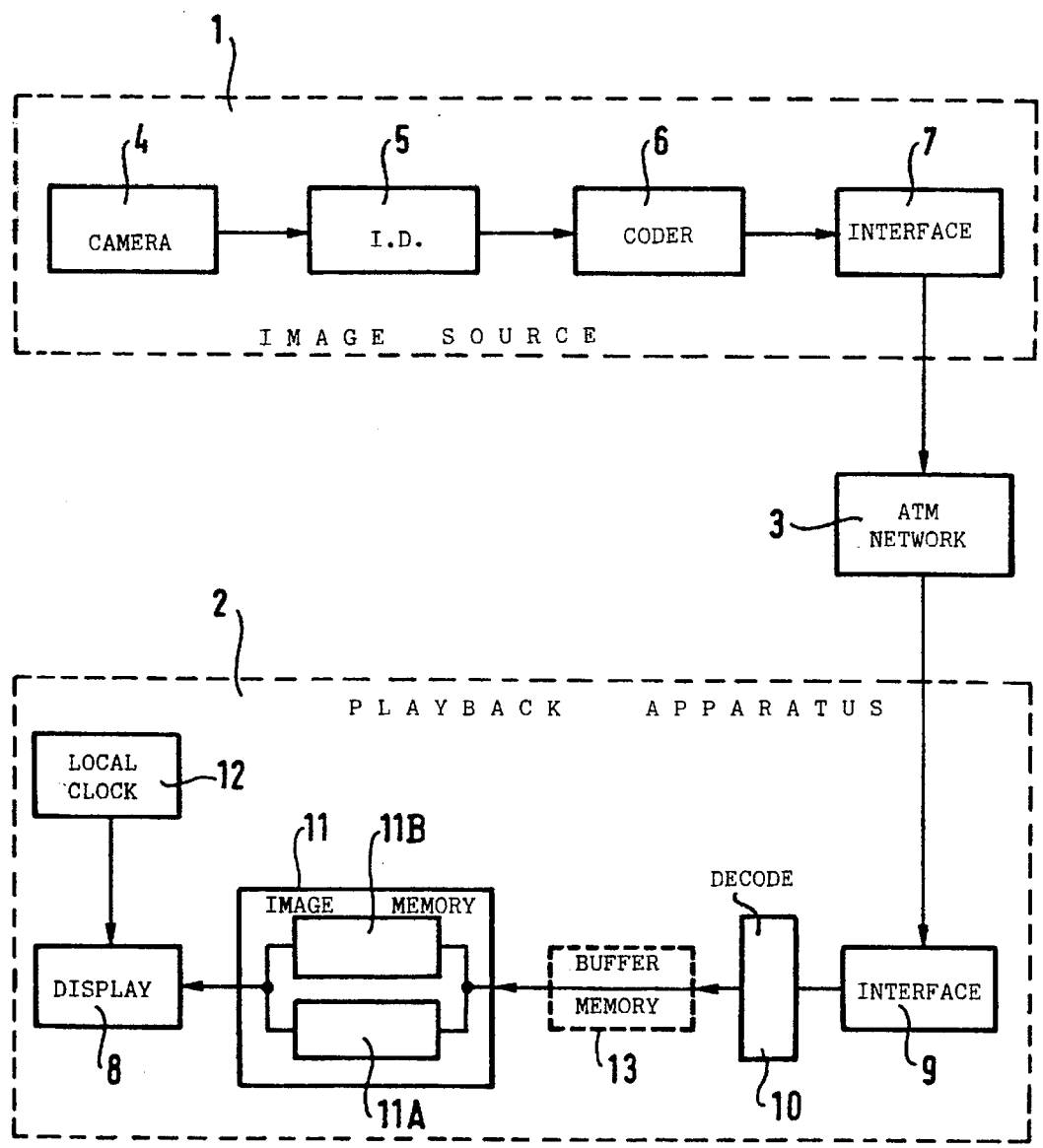
FIG. 1 is a block diagram of a particular embodiment of an image transmission system applicable to filmed sequences where images are transmitted from a source to an image receiver apparatus.

As mentioned above, the diagram of FIG. 1 relates to one example of a system for transmitting images between an image source 1 and a distant apparatus 2 that are suitable for being interconnected by data transmission means 3 which, at least in the example chosen, are designed to be shared between various data sources and/or receivers.

The image source 1 includes a supplier module 4 that supplies image signals, e.g. a module of the camera type and in particular a videophone, enabling sequences to be taken, each of which is acquired in the form of a series of component images where each image is represented by a series of signals that together determine a set which is characteristic of the image.

Alternatively, the supplier module 4 may be of the recorder type, such as a video camera that is suitable for receiving, storing, and subsequently retransmitting images produced elsewhere.

In the embodiment described here by way of example, where images provided are transmitted in digital form, each component image corresponds to a digital data set whose structure is organized in a selected manner and whose size is limited to a value fixed in advance as a function of the capabilities respectively of the source 1, of the apparatus 2, and of the transmission means 3.

By way of example, the apparatus 2 comprises an image playback module 8 such as a television or a monitor, for displaying the images of a filmed sequence coming from the source 1 at a rate R, and enabling any animation that may appear in the filmed sequence to be played back in a manner that is at least realistic and is preferably faithful.

As mentioned above, if the images are scanned at a rate of C of twenty-five or thirty images per second at the source 1, then it is conventional at the playback module 8 to play back the images at a rate R which is twice the rate C.

It is not always possible nor even desirable to servo-control the means which provide signals at the rate R for the purpose of playing back the images to the means which provide the signals at the rate C at the source 1, with this being particularly true when asynchronous transmission means are provided over at least a portion of the transmission path between the source 1 and the apparatus 2.

It then becomes necessary to be able to identify selectively the characteristic digital data sets that correspond to images in a given filmed sequence, even if the images provided are transmitted one after the other. This is achieved in this case by allocating a header marker and an end marker to each set. Each marker is constituted by a special combination of data that comprises, for example, a fixed distinctive portion that is common to all markers of the same type and, if necessary, a distinctive portion that is a function of a characteristic relating to the set to which the marker is attached, e.g. a function of the relative position of the image corresponding to said set in the filmed sequence that includes it.

Furthermore, the size of each set corresponding to an image may be such as to make it impossible to transmit all of one set as a single data train between the source and the receiver module, and that consequently it is necessary for the set to be transmitted in fractions comprising a plurality of data trains spaced apart in time. The trains are then transmitted in application of given common rules.

This applies in particular when the transmission of data sets between the source and the apparatus is likely to require the use of data trains made up of standardized cells such as those defined in CCITT Recommendation I361 for transferring digital data in asynchronous mode, commonly referred to by the abbreviation ATM (asynchronous transfer mode).

In such a case, the source 1 then includes an identifier device 5 placed downstream from the supplier module 4, the device receiving image digital data and characteristic signals which are supplied thereto by the supplier module and which enable it selectively to identify data sets corresponding to different images in a filmed sequence to be transmitted. It serves, in particular, to add an individual header marker and an individual end marker to each set for transmission.

A coder device 6 is disposed downstream from the identifier device 5 to make up the data trains that are to be used for transmitting each data set. In the example shown, where each data train corresponds to a cell of standardized size and organization, the coder device 6 serves to convert each set as specifically identified by the markers added thereto into some number of cells.

In a preferred embodiment of the invention, the coder device 6 also serves to add check data into the cells to enable various verifications to be performed on the cells as received at the apparatus 2. These verifications are performed by comparing the data supplied by the check data contained in the cells with data computed by the apparatus 2 by applying determined rules to the cells it actually receives. The check data and the verifications made possible thereby serve, in particular, to determine whether a set received by the apparatus 2 can be considered as corresponding to the set as originally sent by the source 1. In the intended application, when a received set is determined as being valid, then all of the cells sent by the source 1 relating to that set have been detected as received by the apparatus 2, all of the cells taken into account for said set have been verified as coming from the source 1, and each of the cells satisfies the common rules laid down for all of the sets.

Cells from the source 1 are applied to the transmission means via a send interface 7 which acts as a buffer memory for cells awaiting transfer and which performs the adaptations required for transfer of the cells by the transmission means, which transmission means are represented herein by an ATM asynchronous network referenced 3.

The apparatus 2 is assumed to be connected to the transmission means, represented in this case by the network 3, via a receive interface 9 which performs functions that are the inverse of those performed by the send interface 7, said interfaces being of a structure that is known per se and not described in detail herein insofar as they are only indirectly concerned by the invention. No detailed description is given of the asynchronous network 3 or of the various devices making up the source 1 and the apparatus 2, for the same reasons.

The cells sent to the apparatus 2 and picked up in conventional manner by the receive interface 9 are stored temporarily therein so as to be made available to a decoder device 10. The decoder device 10 verifies that the cells have been properly received by using the check data they contain and by applying the rules mentioned above.

In a preferred embodiment of the invention, the header and end markers of a set are detected after the cells used for transferring the set have been verified, and subsequently processing is applied only to those runs of cells that correspond to sets which can be considered as being valid. This means that the cells and the run of cells making up each of the sets are verified for validity by the decoder device 10, which validity may optionally be achieved only after correction, particularly when an error correcting code is implemented while making up the cells.

Storage means 11 are also provided connected both to the decoder device 10 and to the playback module 8 to make it possible to store temporarily the playable-back image data contained in the most recently received set that is considered as being valid by the decoder device 10.

Image data contained in a set that has been verified as being valid is transmitted from the storage means 11 to the playback module 8 of the apparatus 2 with its timing under the control of a local synchronization clock 12 referred to below as the clock of the apparatus. The clock may be incorporated either in the receiver apparatus 2 or it may be external thereto, as may certain other components made use of by the apparatus. It produces clock signals at the rate R selected for playing back images by the playback module 8, and it is designed to trigger transfer of the data belonging to a first image from the storage means 11 to the playback means 8 as soon as a first set of image data for a transmitted and animated image sequence has been received, verified, and stored.

The images coming from subsequent sets in the filmed sequence under consideration are normally played back successively by the playback module 8 at the design rate R as provided by the apparatus clock 12. Ordinarily, the rate R corresponds to the rate at which the module 4 of the source 1 supplies images under the control of its own clock (not shown).

In a known embodiment, the source 1 delivers twenty-five images per second, each being made up of two interlaced fields. Under such circumstances, images as received by the apparatus are supplied to the playback module 8 at the rate of one image every forty milliseconds.

In practice, an image made up of two interlaced frames is still acceptable if it is reconstituted on the basis of one of the fields only, which field is merely repeated.

Thus, provision is made to transmit only one field per image from the source 1 to the apparatus 2, thereby making an additional time lapse available for accepting the various data trains that arrive to make up each set transmitted to the apparatus. The data envelope duration for a set received at the decoder device 10 in the apparatus depends both on the time required for coding said set at the source 1 and on the time required for it to be transferred from said source to the apparatus 2, and that can have the effect of causing said duration to fluctuate.

In the typical case mentioned above and shown in diagrams 2A to 2D, it is considered that the data envelope durations of the transmitted sets as represented by shading in diagram 2B are always less than half the time lapse normally provided for an image to be displayed, i.e. a time lapse which is assumed in this case to be forty milliseconds and to be defined by "set received" pulses as shown in diagram 2A.

As mentioned above, it is possible on reception to reconstitute the equivalent of two interlaced fields belonging to the same image by redisplaying the elements making up the image as obtained from a single data set as transmitted by the source concerning said image.

In the example shown, provision is thus made to start sending image signals to the playback module 8 at twice the design rate R for displaying the images as determined by the apparatus clock 12, i.e. once every twenty milliseconds, in this case, as symbolized by the pulses in diagram 2C; the image signals as displayed are then those that are deduced from the set which has most recently been received, verified, and stored. The playback module 8 usually displays each image obtained from a given set twice in succession, as symbolized by diagram 2D that represents the images actually displayed. By way of example, it is thus assumed that the image signals referenced "i–1" in diagram 2D have been deduced from a set that has been transmitted, verified, and stored temporarily, which set is likewise referenced "i–1" in diagram 2B. These "i–1" image signals are displayed for a first time immediately after the appearance of the first signal from the apparatus clock (diagram 2C) that occurs after the set "i–1" has been verified and stored, and it is displayed for a duration 1/2R, in this case twenty milliseconds, and is then repeated for the same duration on the following signal from the apparatus clock, such that the resulting image remains identical throughout a time 1/R of forty milliseconds in the example being described. During this time lapse, a second set referenced "i" is received, verified, and if valid, stored; it is taken into account for display purposes on the next following pulse from the apparatus clock, as shown in diagram 2C, and the image signals "i" deduced therefrom are likewise displayed twice over, thus causing a second image to appear for a duration 1/R, and so on.

Insofar as the apparatus clock 2 is not synchronized on the clock at the source 1, a certain amount of slip can occur between the clock at the source and the clock at the apparatus.

Given that the image signals deduced from a transmitted set become available only after the set has been verified for validity, it can happen that the set does not become available in the design time lapse, particularly because of slip between the clocks or because one or several successive sets are found not to be valid.

An example of such an atypical situation due to slip between the clocks is symbolized in diagrams 3A to 3D which relate to the case where it is assumed that a set "i" (diagram 3B) becomes available before a pulse T1 of the apparatus clock (diagram 3C) that would normally have caused the signals of the preceding image "i–1" to be displayed for a second time, such circumstances not having occurred for other received assemblies for some length of time. In this atypical situation which may occur, for example, with a period of the order of tens of minutes, provision is made for the pulse T1 to cause the already available signals of the image "i" to be displayed for a first time instead of displaying the signals of image "i–1" for a second time, as can be seen from diagram 3D.

This means that the signals of image "i–1" are displayed for a time 1/2R only, unlike those of the preceding image "i-2" that were displayed for a time 1/R, with such a reduction in display time not being detectable by the user for whom service quality is therefore not degraded.

The following set "i+1" cannot normally be available when pulse T2 of the apparatus clock immediately following above-considered pulse T1 after a delay equal to 1/2R, so at that point the image signals deduced from the set "i" are displayed for a second time, so that image "i" is displayed for a total duration of 1/R. The signals deduced from each of the received sets are thus again displayed twice, so long as no set is received that fails the verification test and so long as the slip between the source clock and the apparatus clock does not again give rise to the situation described above with reference to pulse T1 and sets "i-1" and "i".

It should be understood that when slip between the clocks takes place in the opposite direction to that described above, then a set that is still being received and that is not yet available is not displayed on the arrival of the pulse from the apparatus clock that would normally have caused it to be displayed for the first time. Under such circumstances, provision is made to display again the image signals deduced from the most recently received set that has been verified successfully. This image is therefore displayed for a total time 3/2R, which would amount to sixty milliseconds in the present case, assuming that the following set is itself verified successfully.

As is the case of slip in the opposite direction mentioned above, images are again displayed twice over for a total time lapse of 1/R for sets that are received and successful verified and that become available in time for the pulse from the apparatus clock immediately following the pulse that triggered the last of the three successive displays of the image signals deduced from a single set. The signals deduced from each of the subsequently received sets are again displayed twice over so long as slip between the clocks at the source and at the apparatus does not lead again to the situation described immediately above, and so long as no sets are received that fail verification.

FIGS. 4A to 4D correspond to a situation where the received sets include a set "i", shown shaded, that is unsuitable for being displayed because it has failed verification and is unsuitable for error correction, assuming that the apparatus has appropriate error correcting means. It is easy to extrapolate the design behavior to a situation where a plurality of successively received sets all fail verification.

Assuming that set "i" that fails verification was preceded by a set "i-1" that was verified successfully, then the image signals derived from the set "i-1" continue to be displayed during the time 1/R that would normally have been occupied by signals deduced from the set "i". The successfully verified set "i-1" from which the displayed image signals are deduced is stored for this purpose, at least until a new set has been successfully verified and stored, which set is referenced "i+1" in this case.

Here again, each of the subsequently received sets is again displayed twice over unless a set is received that fails verification and so long as slip between the source clock and the apparatus clock does not again lead to one of the situations mentioned above.

In general, when it is not possible to supply image data from a set to the playback module 8 of the apparatus within the design time after supplying image data from a preceding set, e.g. because the new set that ought to be supplied has failed verification, then the missing image data is replaced by repeating the image data from the previously received valid set.

This therefore means that the same image can replace one or more immediately following images that are wrongly transmitted. In a preferred embodiment, provision is made to interrupt verification processing on detecting the first invalid and non-correctable set, with this continuing at least until the header marker of the following received set has been detected.

Under the above-mentioned conditions, insofar as it is necessary to have available image data of a set that has been verified as being valid for display, and where it must also be possible simultaneously to take into account image data of the set that would normally be intended for subsequent display, provision is made to provide temporary storage means 11 in the apparatus and capable of containing data relating to two images simultaneously, each in a respective memory unit 11A or 11B. These units are used in alternation, one for storing verified valid image data belonging to the set currently being verified, and the other for temporarily retaining the data of the previously received set, that has been verified as being valid and that is currently being used for image display purposes.

Although the above description assumes that the data envelope durations of the sets transmitted in real time are always less than 1/2R, it is nevertheless possible that such circumstances do not apply and that envelope durations are perhaps greater than 1/2R while nevertheless remaining less than a limit set by the value 1/R.

Figure 2:
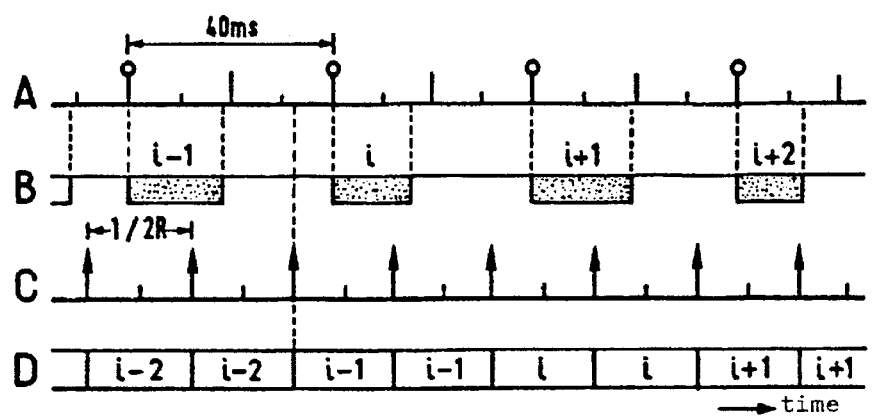
FIGS. 2A, 2B, 2C, and 2D show a first example of image playback in application of the method of the invention.
Figure 5:
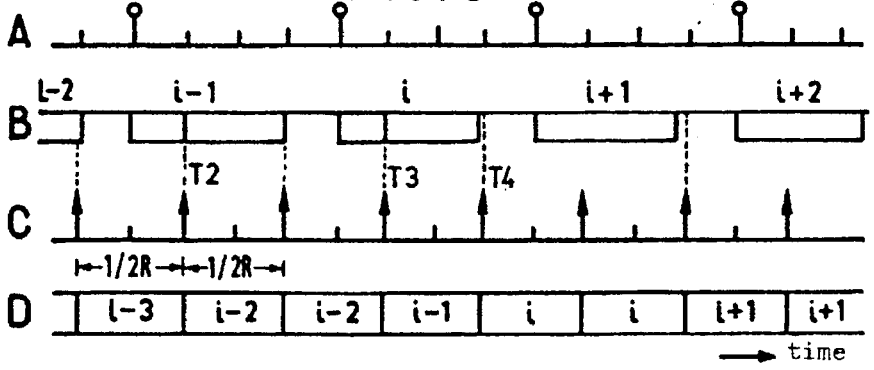
FIGS. 5A, 5B, 5C, and 5D show a fourth example of playback relating to images for which the transmission duration is liable to be greater than half the time lapse normally provided for an image.

Such circumstances are considered in the diagrams of FIG. 5 which correspond functionally to the diagrams of FIG. 2 but for longer envelope durations. In the embodiment considered, as described below, this means that the apparatus needs to be provided with storage means additional to the storage means 11 of the apparatus 1, which additional storage means are assumed in this case to be situated immediately downstream from the decoder 10.

If the data envelopes of different sets that are assumed to be of the same duration for the purposes of conceptual simplification, happen to be greater than 1/2R, as shown in diagram 5B, then it can clearly be seen that it is not possible to store at least the initial envelope data as received for one set in the storage means 11 while the images are being displayed. Thus, assuming that an image "i-2" corresponding to a set "i-2" contained in one of the memory units, e.g. 11A, of the storage means is being displayed, then a subsequently received set "i-1" is still being recorded in the other memory unit 11B in order to enable an image "i-1" to be displayed at following pulse T3, and the initial data of the next set "i" are already being received by the apparatus, so there is no memory available in the storage means 11 for storing said initial data. No provision is made to release the memory unit that contains the image "i-2" (in this case the memory unit 11A) while display is taking place until the following image "i-1" has been found to be valid, since if the image "i-1" is found to be invalid, then it is the data from the set "i-2" that will be displayed again.

To take account of the above, provision is made to insert buffer type additional storage means 13 downstream from the decoder device 10, e.g. included therein or possibly included with the memory units 11A and 11B. The buffer means serve to buffer data that is in the process of being received after verification so as to leave time for one or other of the two memory units to become available for storing said data, with this corresponding, for example, to buffering data received before pulse T2 (diagram 5C) for the set "i-1" (diagram 5B).

As before, assuming that it is decided to display image signals only when the set from which they are derived has been verified as valid and stored, it can be seen that it is from the first pulse of the apparatus clock, e.g. the pulse T3 in diagram 5C for image signals deduced from the set "i−1" of diagram 5B, following such verification and storage that it becomes possible to begin displaying these signals for a time lapse of duration corresponding to n/2R where "n" is a positive integer.

Insofar as the display of images by the apparatus is controlled by the clock 12 of said apparatus and takes place systematically on the basis of the data corresponding to the most recently received set that has been found valid and that has been stored, it is possible to use the above-mentioned storage means 11 in association with the additional storage means 13. As mentioned, the storage means 11 comprise two memory units 11A and 11B which are used in alternation, one for storing valid image data of a set that is being verified, and the other for retaining the data of the most recent set to have been found valid and that is used for displaying the image.

Figure 3:
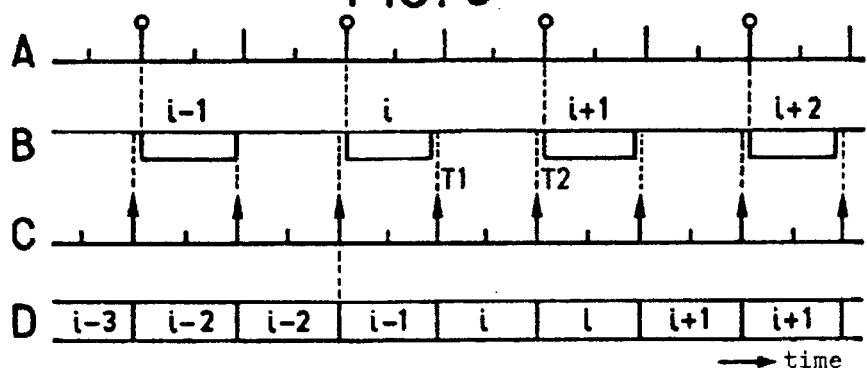
FIGS. 3A, 3B, 3C, and 3D show a second example of playback when there is slip between the source clock and the clock of the receiver apparatus.
Figure 4:
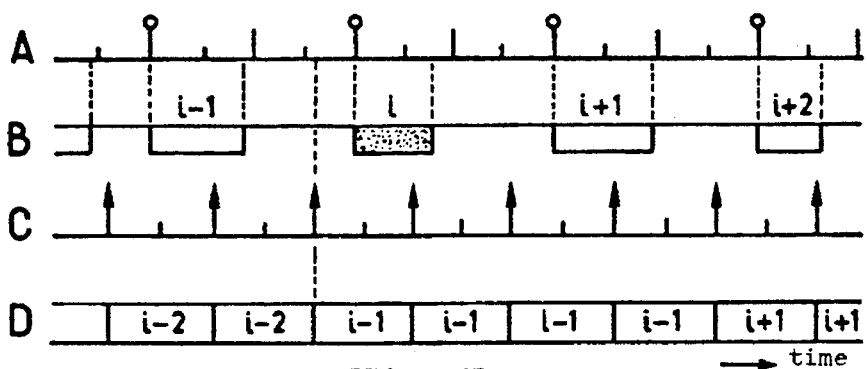
FIGS. 4A, 4B, 4C, and 4D show a third example of playback when image transmission is disturbed.

It is also possible, and consequently provision is made, to implement the playback method in the manner described with reference to the various diagrams shown in FIGS. 2 to 4, when the data envelopes of a set have durations that remain less than the value 1/R. As before, depending on the direction of slip between the source clock, such as 5A, and the apparatus clock, such as 5B, provision is therefore made either to eliminate a repeat of one of the images, should that be necessary, or else to repeat an image an extra time. Provision is also made to use the most recently received valid set for image display purposes until another valid set has been stored. This is not described in greater detail herein since a detailed description thereof has substantially already been given with reference to FIGS. 2 to 4, and the corresponding implementation can be deduced therefrom in simple manner.

We claim:

1. A method of playing back in sequence a series of images at a playback rate enabling realistic and almost instantaneous playback of any animations that appear in the sequence, wherein said images are supplied in succession and in digital form by a remote source to a receiver, with each image being respectively transmitted to the receiver in the form of an independent set of successive data trains organized by application of rules common to the sets, wherein said sets have a common maximum possible size and are individualized, in particular by two individual image markers, one positioned as a header and the other at the end of each set, the method comprising the step of generating said playback rate locally and in a self-contained manner and further comprising repetitively performing the following operations on reception:

verifying the validity and the serial order of the data trains successively received for a set;

reconstituting each set that has been transmitted validly by means of data trains;

temporarily storing at least the most recently received set that has been verified as being valid; and playing back visually the image corresponding to the most recently received and stored valid set for a time lapse that is equal to one of an image-presence time fixed by the chosen playback rate and a multiple of said image-presence time.

2. A playback method according to claim 1, for said series of images representing a filmed sequence in which each image is played back by means of two interlaced fields, wherein the set of data trains belonging to each transmitted image includes data relating to one only of the two fields constituting each said image, each valid transmitted set being normally intended for visual reproduction twice over during a single image presence time, and being possibly visually reproduced some other number of times, should that be necessary, in the event that there exists a slip-generating difference between the playback rate and the rate governing the sequence as sent and/or in the event that at least one received set of data trains is found invalid.

3. An apparatus for playing back almost instantaneously a sequence of images at a realistic visual playback rate R for the sequence on the basis of a run of images supplied successively in digitized form by a remote source, with each image being transmitted in the form of an independent set of successive data trains organized by application of rules that are common to the sets, each set being individualized by two markers, one placed as a header and the other placed at the end of each set, said apparatus comprising:

verification means for verifying that each received data train and each run of data trains making up an individualized set complies with said rules and is therefore valid;

temporary storage means for temporarily storing at least the most recently obtained valid set;

means for reconstituting signals required for visual reproduction of said most recently received valid set, and clock means for generating the playback rate required for triggering visual reproduction of an image corresponding to the most recently received valid set temporarily stored in said storage means.

4. An apparatus according to claim 3, including additional storage means disposed between said verification means and said temporary storage means.

* * * * *